United States Patent
Cheung et al.

[19]

[11] Patent Number: 5,825,579
[45] Date of Patent: Oct. 20, 1998

[54] DISK DRIVE SERVO SENSING GAIN NORMALIZATION AND LINEARIZATION

[75] Inventors: Wayne Leung Cheung, San Jose; Donald L. Clare, Morgan Hill; Louis Joseph Serrano, San Jose, all of Calif.

[73] Assignee: International Business Machines Corporation, Armonk, N.Y.

[21] Appl. No.: 628,217

[22] Filed: Apr. 4, 1996

[51] Int. Cl.$^6$ .................................................. G11B 5/596
[52] U.S. Cl. ..................................... 360/77.08; 360/77.02
[58] Field of Search ............................. 360/77.08, 77.02, 360/77.05, 78.14

[56] References Cited

U.S. PATENT DOCUMENTS

| | | |
|---|---|---|
| 4,498,129 | 2/1985 | Velazques . |
| 4,511,938 | 4/1985 | Betts . |
| 4,578,723 | 3/1986 | Betts et al. . |
| 4,669,004 | 5/1987 | Moon et al. . |
| 4,679,103 | 7/1987 | Worman . |
| 4,740,736 | 4/1988 | Sidman et al. . |
| 4,783,705 | 11/1988 | Moon et al. . |
| 4,835,633 | 5/1989 | Edel et al. . |
| 4,870,370 | 9/1989 | Hedberg et al. . |
| 4,951,273 | 8/1990 | Yoshida et al. . |
| 4,967,404 | 10/1990 | Orlicki et al. . |
| 5,065,382 | 11/1991 | Seko et al. .................... 360/77.08 X |
| 5,109,367 | 4/1992 | Yoshikawa . |
| 5,189,571 | 2/1993 | Murphy et al. . |
| 5,206,570 | 4/1993 | Hargarten et al. . |
| 5,268,800 | 12/1993 | Nielsen ........................... 360/77.08 X |
| 5,278,703 | 1/1994 | Rub et al. . |
| 5,309,299 | 5/1994 | Crossland et al. . |
| 5,381,281 | 1/1995 | Shrinkle et al. ..................... 360/77.08 |
| 5,384,524 | 1/1995 | Romano . |
| 5,442,498 | 8/1995 | Cheung et al. ...................... 360/77.08 |
| 5,600,506 | 2/1997 | Baum et al. ........................ 360/78.14 |
| 5,602,693 | 2/1997 | Brunnett et al. .................... 360/77.08 |

*Primary Examiner*—Aristotelis M. Psitos
*Assistant Examiner*—James L. Habermehl
*Attorney, Agent, or Firm*—Ingrid M. Foerster; Monica D. Lee

[57] ABSTRACT

An apparatus, system and method are described for generating a continuous and linear position signal generated from stitched position error signal (PES) components, for use by a servo control system in positioning a transducer with respect to a storage surface. Continuity is achieved by providing a normalization stage in the servo control loop for correcting discontinuities at the stitch points with minimal impact to the PES zero-crossing points. According to a first preferred embodiment normalization is applied using an algorithm determined by the width of the read transducer. According to a second preferred embodiment, normalization is selectively applied near the stitch points of the PES components, but is not applied at their zero-crossing points. In another preferred embodiment, a first normalization algorithm is applied near the stitch points, and a second normalization algorithm is applied at the zero-crossing points. In a fourth embodiment, a smoothing function is applied between the stitch points and zero-crossings to smooth the transition from normalized to unnormalized signal contributions or from signal contributions normalized in a first manner to signal contributions normalized in a second manner. A further aspect of the present invention is to determine whether the PES exceeds a nominal value and if so, to hold the PES at the nominal value at each stitch point.

94 Claims, 10 Drawing Sheets

NORMALIZED P AND Q, USEFUL SECTION ONLY $$\frac{P}{|P|+|Q|}$$

$$\frac{Q}{|P|+|Q|}$$

(WIDE READ WIDTH)

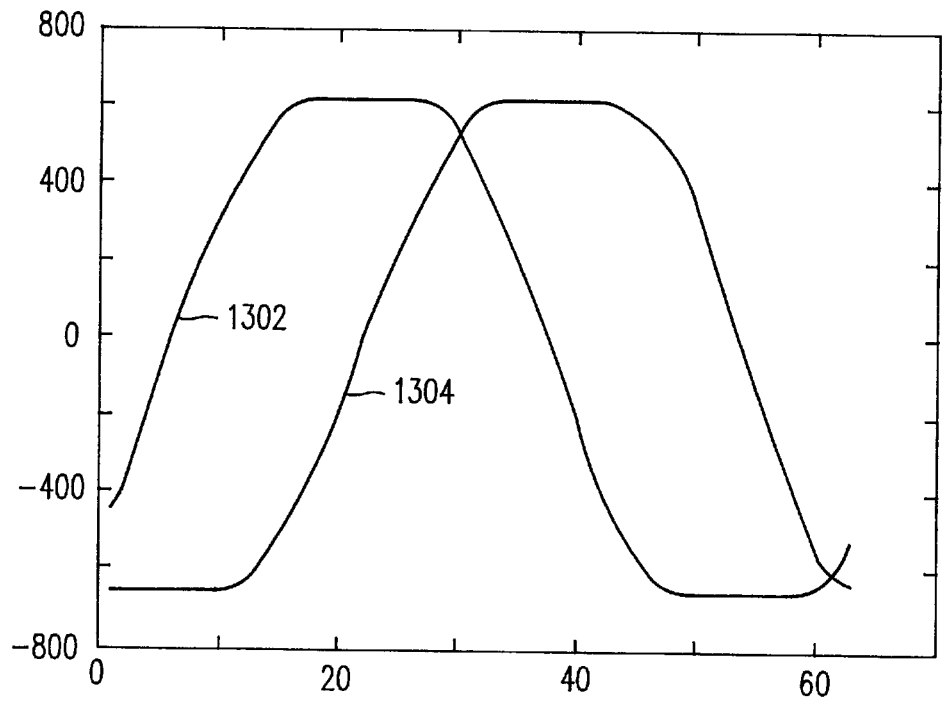
FIG. 13A
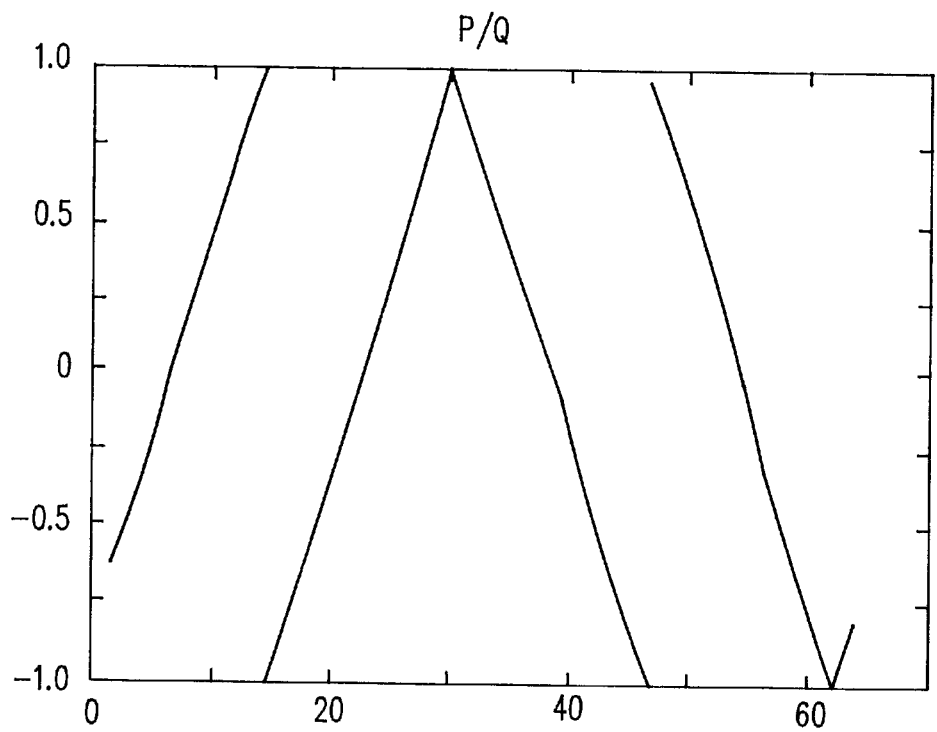
NORMALIZED P AND Q, USEFUL SECTION ONLY  $\frac{P}{|Q|}, \frac{Q}{|P|}$
FIG. 13B  (NARROW READ WIDTH)

DISK DRIVE SERVO SENSING GAIN NORMALIZATION AND LINEARIZATION

FIELD OF THE INVENTION

The present invention relates generally to actuator servo control systems used for positioning read/write transducers in data storage devices, and more particularly, to a system and method to compensate for servo position error sensing gain variation.

BACKGROUND OF THE INVENTION

Disk and tape data storage devices are well known in the art. The data is stored as a plurality of data tracks of predetermined format disposed on a recording medium such as a magnetic disk, an optical disk, or magnetic tape. The data is written to and read from the tracks using one or more transducers or read/write heads, which are electrically coupled to signal processing electronics to provide a data transfer path between the media and a requesting system external to the storage device.

The heads are supported in close proximity to the media by a head positioning assembly capable of operating in two distinct modes: track seeking and track following. During track seeking, the heads are moved transversely to the tracks from a current data track to a desired or target track in response to a read or write request from the external system. Track following is the function of maintaining a head in alignment with a track while reading, writing, or merely idling.

In most storage devices, movement of the head positioning assembly is controlled by a closed loop servo system comprising a combination of servo electronics and microcode. Closed loop systems utilize position information obtained from the surface of the storage medium as feedback to perform the seeking and track following functions. Examples of closed loop servo control system are provided in commonly assigned U.S. Pat. Nos. 4,679,103 and 5,404,254. Some disk drive designs hold servo information on a single, dedicated disk surface (i.e., dedicated servo). Other disk drive designs, and most tape drives, provide servo information embedded between the data regions of the storage media (i.e., embedded servo).

Servo information typically includes a track identifier and a burst pattern which are combined to produce a position signal. The track identifier is commonly in the form of a grey code or track address and is used to uniquely identify the track currently beneath the transducer. The burst pattern produces an analog signal indicative of track type and head offset with respect to the center of the current track. If a quadrature burst pattern is used, the resulting analog signal is demodulated into primary (PESP) and quadrature (PESQ) signals. When the head moves transversely to the tracks during a seek operation, the track identifier and quadrature contributions are combined or "stitched" together to ideally provide a linear position signal. As storage devices move toward greater track densities, the accuracy of the position signal becomes increasingly important for enabling data storage and retrieval, particularly when using magnetoresistive (MR) heads. MR heads comprise a magnetoresistive read element in combination with an inductive write element. Manufacturing tolerances in the production of MR heads typically causes an offset between the respective centers of the read and write heads which results, on occasion, in the read head servoing at or near the stitch points of the position signal. This is necessary to center the read head to an offset position aligned with the radial position where data has been written. Discontinuities at these junctures may cause relatively large changes in the position signal for very small real head movement, resulting in erratic actuator movement.

Unfortunately, the position signal often includes discontinuities at the stitch points due to PES gain variation. Gain variation is attributable to such factors as write width modulation, servowriter runout, transducer fly height, variations in head width, and gain errors introduced by the automatic gain control (AGC) process itself.

One approach for correcting nonlinearity of the position signal is to include a gain adjustment stage prior to the servo control loop. For example, commonly owned U.S. Pat. No. 4,578,723 addresses nonlinearities in the slope of the position signal in a disk drive due to variations in electromagnetic read head widths. The reference discusses a number of techniques for controlling the AGC output gain. One technique uses the sum (p+q) of contributions from a pair of servo tracks to normalize the position error signal, since this sum corresponds to the full head width and is therefore a constant quantity. (The p+q sum referred to in this reference is equivalent to the sum of A+C in a quadrature burst environment, i.e., the sum of the contributions from bursts positioned to either side of the center of a data track.) The position error signal (which is comparable to PESP in a quadrature environment) is given by (p−q)/(p+q) multiplied by a constant. The problem with this approach is that although it provides some standardization of gain, it does not correct for nonlinearity, errors in the slope of the position error signal or dicontinuity at the stitch points of the final position signal.

A second approach discussed in the reference is to add a calibration step at the output of the AGC loop to bring the AGC gain within a predetermined acceptable range. However, this approach also fails to correct for nonlinearities and tends to only be nominally effective at the stitch points.

Another technique, proposed by the reference, is to include a gain function generating means in the AGC loop to provide, at any radial position of the head, a gain function which is a measurement of the rate of change (i.e. slope) of the position error signals per track of displacement. The gain control loop controls a variable gain amplifier in dependence on the gain function so as to keep the measured rate of change substantially constant. While this approach works on average on a sector-by-sector basis, it leaves open the possibility to discontinuities at the stitch points.

What is needed, therefore, is a system and method for providing a continuous and linear stitched position signal for use in positioning a transducer relative to a storage surface.

SUMMARY OF THE INVENTION

Accordingly, a system and method are described for generating a continuous and linear position signal generated from stitched position error signal (PES) components, for use by a servo control system in positioning a transducer with respect to a storage surface. Continuity is achieved by providing a normalization stage in the servo control loop for correcting discontinuities at the stitch points with minimal or no impact to the PES zero-crossing points. According to a first preferred embodiment normalization is applied using an algorithm determined by the width of the read transducer. According to a second preferred embodiment, normalization is selectively applied near the stitch points of the PES components, but is not applied at their zero-crossing points. In another preferred embodiment, a first normalization algorithm is applied near the stitch points, and a second normalization algorithm is applied at the zero-crossing points. In a fourth embodiment, a smoothing function is applied between the stitch points and zero-crossings to smooth the transition from normalized to unnormalized signal contributions or from signal contributions normalized in a first manner to signal contributions normalized in a second manner. A further aspect of the present invention is to determine whether the PES gain exceeds a nominal value and if so, to hold the gain at the nominal value at each stitch point.

DESCRIPTION OF THE DRAWINGS

For a fuller understanding of the nature and advantages of the present invention, as well as the preferred mode of use, reference should be made to the following detailed description read in conjunction with the accompanying drawings.

FIGS. 12A and 12B and 13A and 13B illustrate the primary and quadrature waveforms before and after normalization as representative of read transducers having wide and narrow effective widths, respectively.

DETAILED DESCRIPTION OF THE PREFERRED EMBODIMENTS

Figure 1:
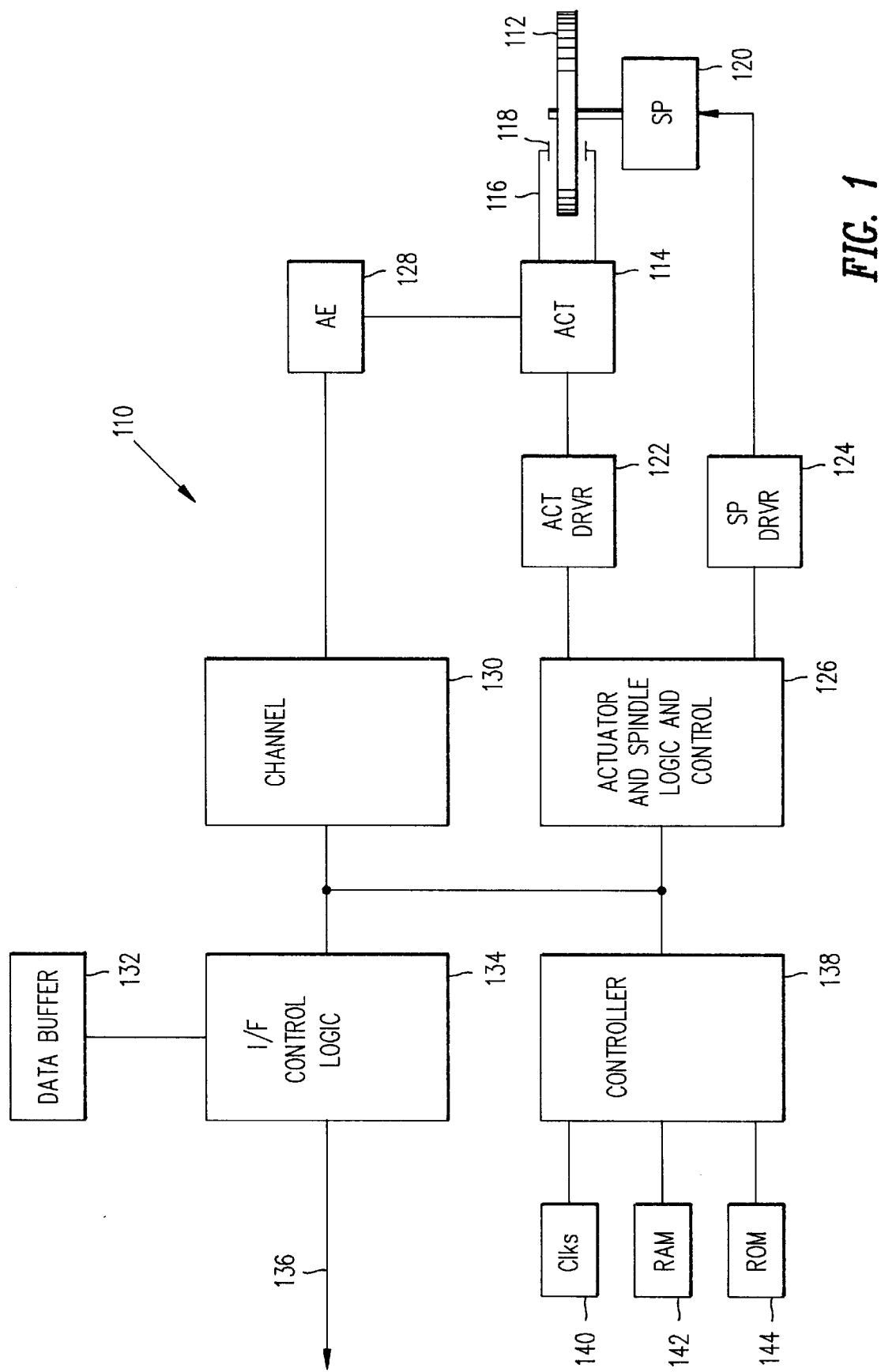
FIG. 1 is a block diagram of a magnetic disk drive suitable for implementing the present invention.

The present invention provides a system and method for the accurate positioning of an actuator in a storage device. FIG. 1 illustrates the preferred storage system for practicing the present invention. To facilitate the reader's understanding, the preferred embodiment is described in the context of a magnetic storage device having a rotating media and a transducer positionable in a substantially radial direction. However, it shall be understood that the present invention is readily adaptable to other types of storage devices, including optical storage devices and tape drives with transversely positionable heads relative to the data tracks of the recording media.

The disk drive system 110 of FIG. 1 stores information on the surfaces of one or more stacked magnetic disks 112 in the form of magnetic transitions or patterns formed on a plurality of concentric data tracks. The disks are rotatably mounted on a spindle motor 120, and rotation of the motor is driven by a spindle motor driver 124. The magnetic transitions are sensed or "read" from the disk 112 via one or more transducers 118 supported in close proximity to the disk surfaces. The transducer converts the patterns into an electrical signal which is provided to a data channel 130. The data channel may comprise a partial response, maximum likelihood (PRML) channel, for example.

The transducers are positioned over the disk surfaces by a rotary actuator assembly 114 comprising a voice coil motor (VCM) and a positionable block of one or more actuator arms supporting the transducer(s) on flexible suspension(s) 116. The VCM is driven by actuator driver circuit 122. Control of the actuator and spindle motor driver circuits 122, 124 is provided by actuator and spindle control logic 126 that preferably includes a digital signal processor for carrying out the various operations of the actuator and spindle motor servo control loops.

The write path of the disk drive 110 comprises interface control logic 134 and data buffer 132 for receiving data and commands from the host, a write path within the read/write channel 130 for processing the data prior to writing, and a write transducer 118 for writing the modulated signal to the disk 112. The read path, conversely, comprises a read transducer 118 for sensing data from the disk 112, arm electronics 128 on the actuator for preamplifying the read signal, a read path within channel 130 for processing the amplified signal, and a read path within the interface control logic 134 for transmitting the read data from the file in a form recognizable to the device requesting the data. In the preferred embodiment, the read/write channel also includes servo detection logic for detecting position information written on one or more of the disks 112. The specific functions of the read and write data path elements are well understood by skilled artisans and as such, will not be discussed in further detail.

Master control over the various functions of the disk drive is exercised by a controller 138, which preferably comprises a microprocessor embedded with additional support functions (e.g., counters, an interrupt controller, a direct memory access (DMA) controller, a serial interface controller, and other functions generally known to assist microprocessor control functions). The controller is normally associated with a predetermined amount of read-only-type memory (ROM) 144 for storing a microcode control program; RAM 142; and a reference clock 140. The controller 138 directly oversees operation of the interface control logic 134, the data channel 130, and actuator and spindle control 126 in a manner generally understood in the art.

Figure 2:
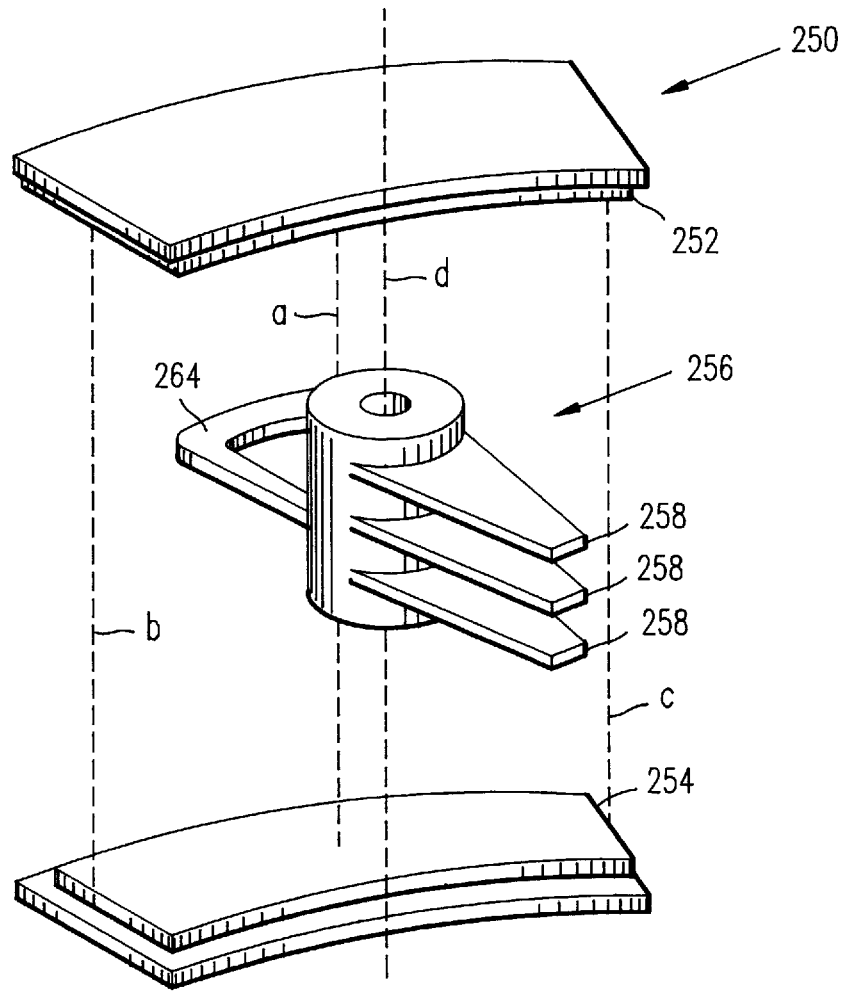
FIG. 2 is an exploded perspective view of a rotary actuator assembly suitable for implementation of the present invention.

FIG. 2 shows a rotary actuator assembly suitable for use in the disk drive of FIG. 1 and for control by the servo control system and method of the present invention. It shall be understood that the actuator of FIG. 2 is provided for illustration purposes only, and that the present invention may be implemented to control a wide variety of actuator assembly designs, including linear actuators, provided that the movement of the actuator is in response to a control signal. The assembly 250 has an arm structure 256 disposed between a pair of permanent magnets 252, 254. The magnets are affixed to opposing walls of the disk drive enclosure (not shown), and generate a magnetic field therebetween. The magnetic field is strongest along a central axis a, and weakest at the outer fringes, as represented generally by axes b and c. The arm structure 256 includes a plurality of arms 258 extending in a first direction and a voice coil 264 extending in the opposite direction. The coil 264 receives a control current from a power amplifier (not shown) and in response, generates a magnetic flux. The magnetic flux interacts with the permanent magnet field to produce a moving force upon the actuator structure 256, causing it to rotate about a pivotal axis d. The range of movement of the coil 264 lies in a plane substantially parallel to the planes of the magnets, and is restricted to the magnetic field by crash stops (not shown) disposed proximate to the outer boundaries of the permanent magnet field. The propulsion means of the assembly, i.e. the coil 264 and permanent magnets 252, 254 constitute a voice coil motor (VCM).

Figure 3:
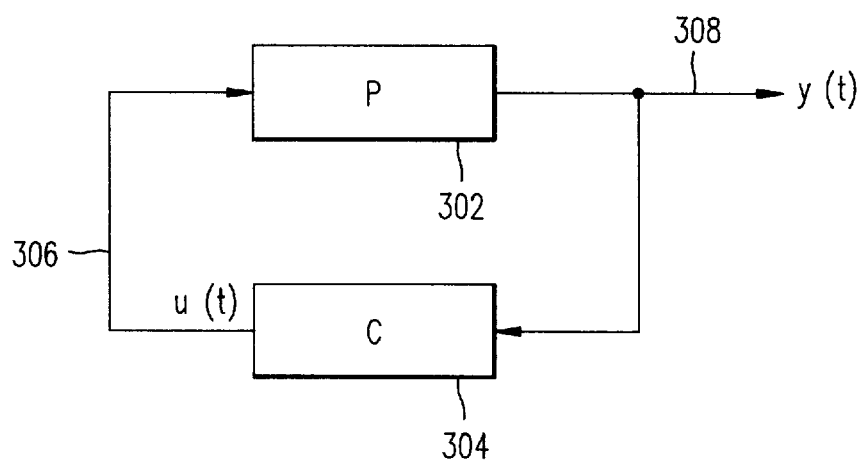
FIG. 3 is a simplified block diagram of a closed loop servo control system.

Referring now to FIG. 3, a servo control system is shown in block diagram form, including a plant 302 consisting of the actuator assembly 312, driver electronics 310, and signal detection electronics 314; and a controller 304, consisting of servo electronics and microcode. As shown in FIG. 3, the input to the plant 302 is a control signal u(t) 306 commanding the amount of current provided to the voice coil. The output from the plant 302 is a position signal, y(t) 308, typically comprising a combination of track type, track identifier or grey code, and position error signal (PES), for reporting the actuator position with respect to the disk surface. A more detailed description of the manner in which the position signal is generated will be described subsequently.

The controller 304 is arranged in a feedback path to the plant 302. Its inputs are the position signal output from the plant 302, and positioning information provided in commands received from a requesting device. The output of the controller is the control signal u(t) 306 that is input to the plant 302. In general, the purpose of the feedback path is to adjust the control signal u(t) 306 to account for deviations in actual performance versus nominal performance so that the actuator more closely follows an expected nominal behavior representative of a population of disk drives of the same design. The accuracy of u(t) depends both upon the accuracy of the position signal provided from the plant, and the accuracy with which the servo system models the actuator behavior. The present invention focuses upon the former.

Figure 4A:
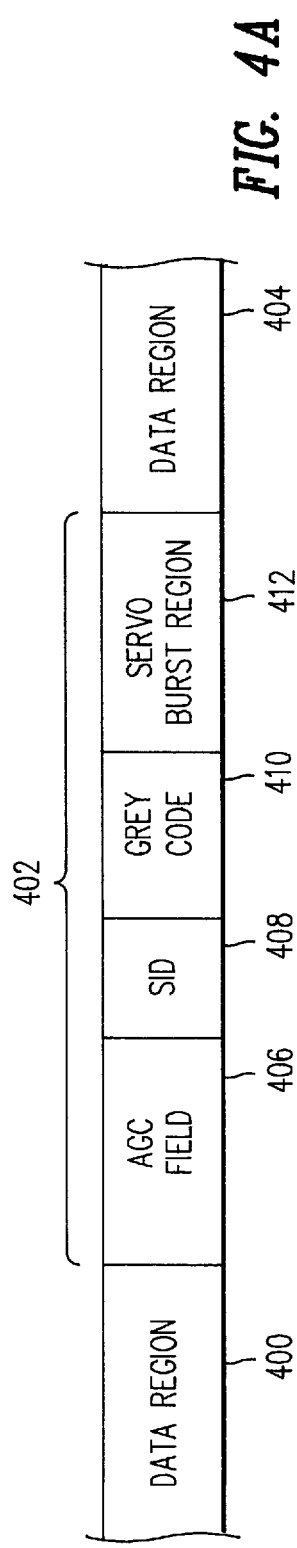
FIG. 4A is an example of a servo sector format suitable for practicing the present invention.

The position information used by the closed loop system of FIG. 3 is preferably obtained from servo information stored on the surface of the recording media. For example, in a sectored servo disk drive, the track identifier and PES are obtained from servo information embedded on each disk between data regions. An example of a servo sector 402 embedded between data regions 400 and 404 is shown in FIG. 4A. The servo sector 402 comprises a synchronization or AGC field 406, a sector identification mark (SID) 408, a track identifier or grey code 410, and a servo burst region 412. The AGC field 406 typically comprises a repeating synchronization pattern, and is used to adjust the servo detection logic to the amplitude and phase of the servo information to follow. The track identifier or grey code field 410 includes a numerical value for uniquely identifying the current track and servo sector 402. The grey code comprises, for example, an encoded three bit binary number that varies by only one bit with respect to grey codes of adjacent tracks. This field also or alternatively includes track identifying information such as the cylinder, head and sector numbers corresponding to the particular servo sector. The grey code field is followed by a servo burst region 412, preferably of the quadrature burst type. Although a sectored servo track format is shown for purposes of illustration, it shall be understood that the present invention is readily adaptable to dedicated servo architectures.

Figure 4B:
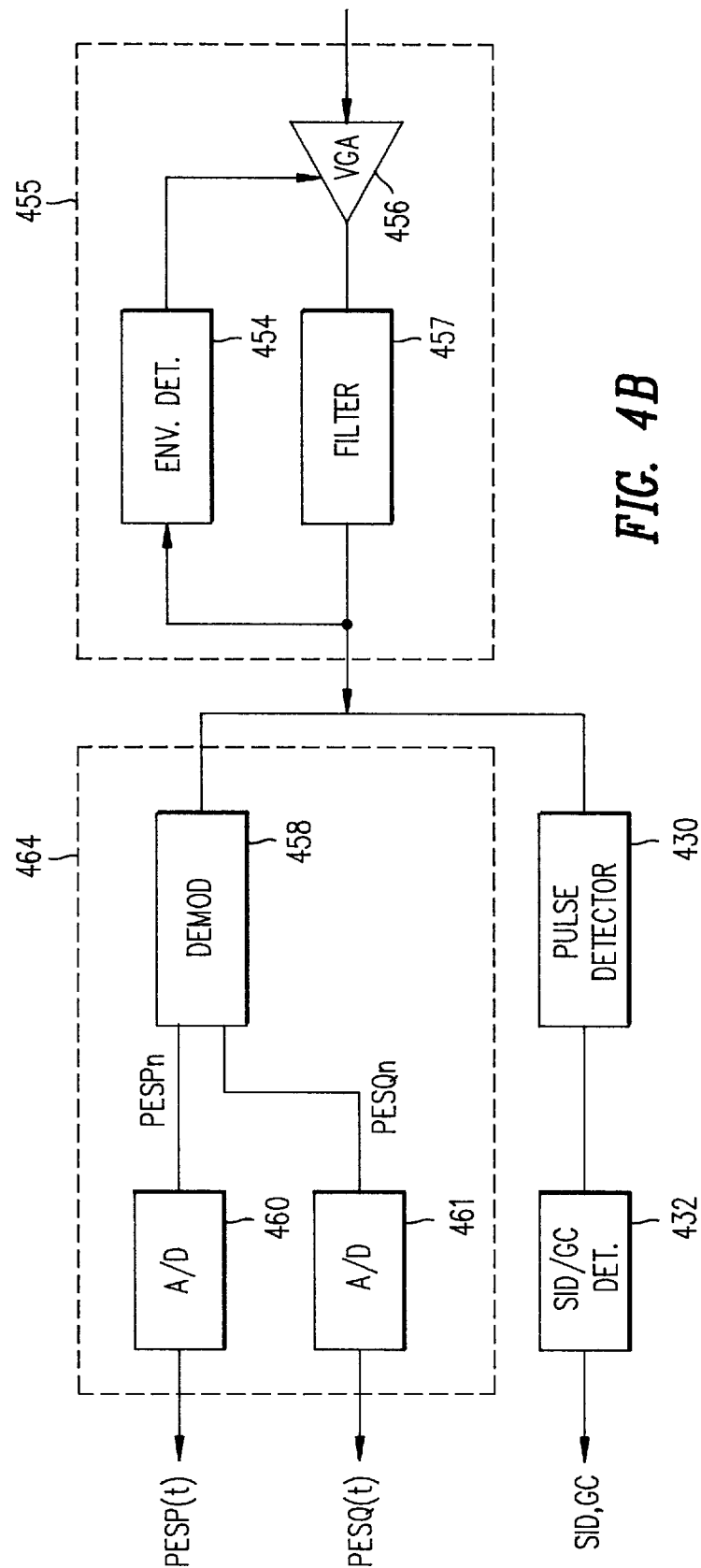
FIG. 4B is a block diagram of servo detection logic suitable for implementing the present invention.

Conversion of the servo information into a position signal for use by the servo control loop involves a number of stages, including both hardware and software operations. In a first stage, the servo information is sensed and processed by servo detection logic in the read/write channel 130. The servo detection logic of the preferred disk drive embodiment is shown in FIG. 4B. A transducer (not shown) senses the information from the disk surface and transduces it into an electrical signal which is provided to an AGC circuit 455. The AGC circuit comprises, for example, a variable gain amplifier 456, a filter 457, and a feedback path comprising an envelope detector 454. The AGC circuit 455 uses the amplitude of the repeating pattern in the AGC field 406 to tune the VGA 456 to a predetermined nominal gain so that the AGC output signal has a predetermined nominal amplitude. The amount of gain required will be dependent, for example, on the characteristics of the read transducer and the transducer fly height. AGC circuits are well-known in the art, and as such will not be explained in further detail.

The output of the AGC circuit 455 is coupled to a pulse detector 430 and a demodulating circuit 464. The pulse detector synchronizes to the phase of the AGC field 406 pattern and produces binary pulses indicative of the SID and grey code fields 408, 410. These pulses are provided to a SID/grey code detector 432 in the controller 138 for detection and subsequent use in producing the position signal.

The demodulating circuit 464 comprises, for example, a demodulator 458 and a pair of A/D converters 460, 461 coupled to the demodulator 458 outputs. The outputs of A/D converters 460, 461 are coupled to the disk drive controller 138 (not shown in FIG. 4B). The demodulator 458 receives an analog signal obtained from the servo burst region 412 and demodulates it into primary and quadrature analog signals, PESP and PESQ. Briefly, PESP and PESQ are position error signals indicative of the read transducer's alignment at a sample time, t, to the current track. These signals will be discussed in further detail below. The demodulated signals are then digitized by A/D converters 460, 461 to generate digital position error signals, PESP(t) and PESQ(t), where t represents a sample time.

The specific steps for generating a position signal from the embedded servo information will now be described with reference to FIG. 5. A grey code region 410 is shown including four grey code tracks, each having a value as designated by the labels GC0–GC3. Numerous grey code encoding schemes are used in the art, and the particular encoding scheme used is not considered pertinent to the present invention, provided that whichever grey code or track identifying information is used, it will in some way enable identification of absolute track position. Grey code track width is indicated by the arrows 502.

Adjacent to the grey code region 410 is the servo burst area 412. Two complete sets of radially disposed, analog quadrature burst patterns are shown with portions of other sets. It will be appreciated that while the preferred embodiment is described for a disk drive employing quadrature burst servo patterns, the present invention is also applicable to disk drives having other types of position information patterns, since the present invention provides a benefit to any servo positioning system that requires stitching of position pattern signals.

Each quadrature burst pattern comprises a group of four radially offset bursts, A–D, 504, 506, 508, 510 and 503, 505, 507, 509. In the present example, bursts of the same group are radially offset by half of a grey code track width 502. For example, the upper edge of burst B 506 is transversely offset from the upper edge of burst A 504 by a half track width. In addition, each group of servo bursts is radially offset from the other groups by two grey code track widths 502. For example, the upper edge of burst A 504 and the upper edge of burst A 503 are radially offset by grey code tracks GC0 and GC1.

As a read transducer passes over the servo burst region 412, it senses the amplitudes of the nearest servo bursts and provides a composite, analog amplitude signal to the AGC circuit 455 of the servo detection logic. The demodulator 458 receives the amplified signal and generates two separate waveforms: a primary signal (PESP) 520 and a quadrature signal (PESQ) 522, as shown in column 516. These signals are then calibrated (described below). The waveforms are functions of the transverse or radial head position relative to the bursts. For the present example, $$PESP=A-C, \qquad (1)$$

and $$PESQ=B-D, \qquad (2)$$

where A, B, C and D represent the sensed amplitudes of bursts A–D. Thus the PESP signal 520 will ideally have a zero value whenever the read transducer is radially positioned between any two adjacent A and C bursts, e.g. along line 512 as indicated by the corresponding zero crossing point 524. Each A=C point aligns with a grey code track boundary. The signal will ideally have a maximum value whenever the read head is positioned at the center of an A burst (e.g. point 526 corresponding to A burst 503) and a minimum value when the read head is positioned at the center of a C burst (e.g., point 528 corresponding to C burst 508). Each maximum or minimum PESP value corresponds to a center of a grey code track, as indicated, for example, by line 514. The PESQ signal 522, in contrast, will ideally have a zero value at each grey code track center (e.g., point 530 along line 514), i.e., whenever the read transducer is radially positioned between any two B and D bursts. The signal will ideally have a maximum or minimum value whenever the read head is positioned on a grey code track boundary (e.g., points 532 and 534).

The PESP and PESQ waveforms, 520, 522, are provided to the A/D converters 460, 461. The digitized output values from the converters are represented as PESP(t) and PESQ(t) for a sample time t, and are used by the controller 138 to determine the current track type, e.g., according to the following algorithm.

```
IF {PESP(t) > PESQ(t)},
    THEN IF {PESP(t) < -PESQ(t)}, THEN the track type
    is zero and PESP(t) will be used;
    ELSE IF {PESP(t) > -PESQ(t)}, THEN the track
    type is one and PESQ(t) will be used;
IF {PESP(t) < PESQ(t)},
    THEN IF {PESP(t) > -PESQ(t)}, THEN the track
    type is two and -PESP(t) will be used;
    ELSE IF {PESP(t) < -PESQ(t)}, THEN the track
    type is three and -PESQ(t) will be used.
```

For any radial position, the track type determines whether the PESP(t) or the PESQ(t) signal (or their inverted signals, -PESP(t) and -PESQ(t)) will be used to generate the position error signal (PES) portion of the position signal output from the servo control loop. There are four track types according to the present example.

Figure 5:
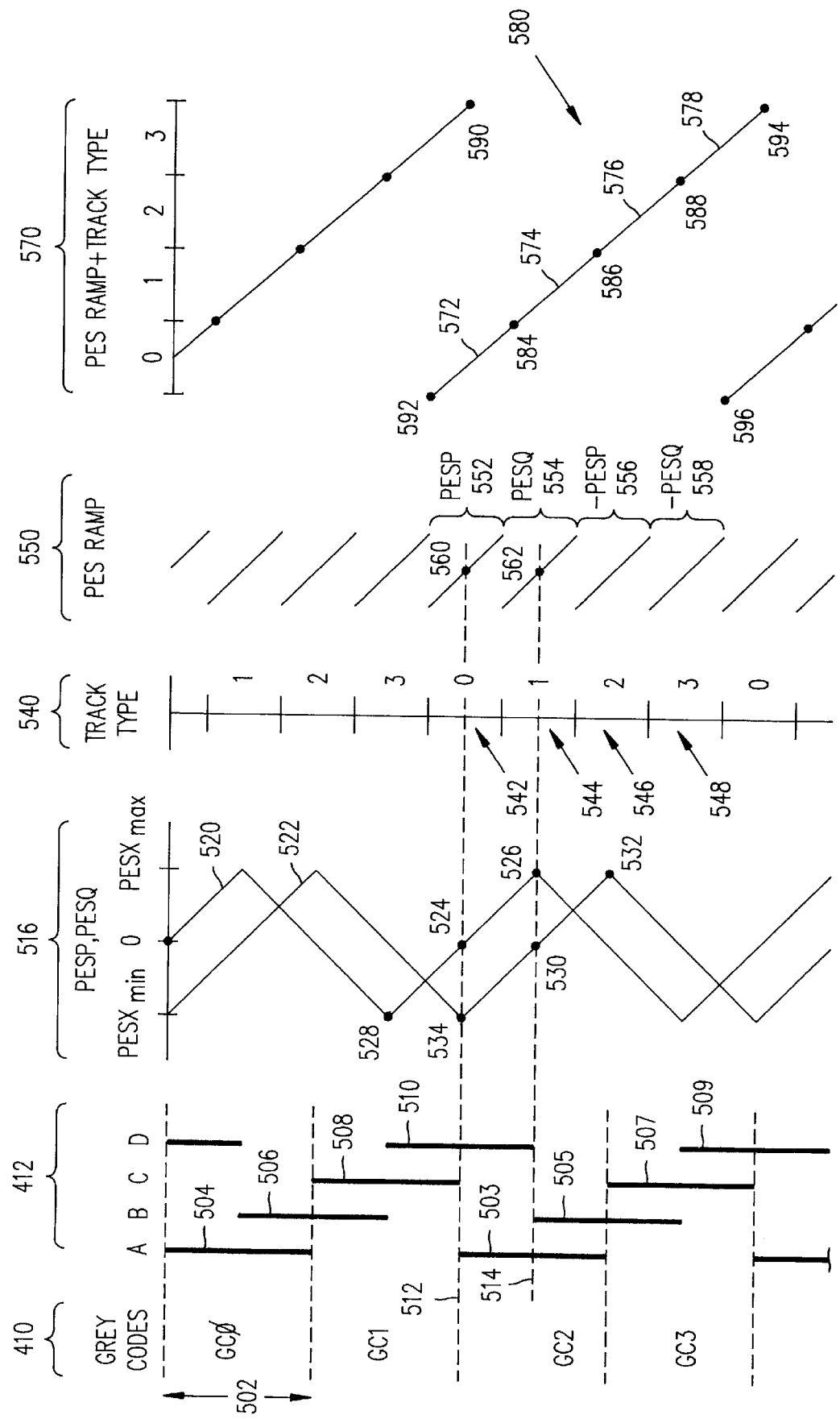
FIG. 5 illustrates the general steps involved in generating a stitched position signal from a quadrature burst pattern, as is suitable for practicing the present invention.

Column 540 of FIG. 5 shows the relationship of the track types to the PESP and PESQ curves 520, 522. As should be apparent from the above algorithm, each zero track type is defined to have a center at a zero crossing point of the PESP curve 520 when its slope is positive. For example, zero-type track 542 corresponds to zero crossing point 524, which is located along a rising segment of the PESP curve 520. Similarly, each type one track is centered at the zero crossing point of a positively sloping portion of the PESQ curve (e.g. type-one track 544 corresponding to zero crossing point 530 on a rising segment of the curve). Track types two and three are the inverses of types zero and one. That is, their centers correspond to zero crossings along the negatively sloping portions of the PESP and PESQ curves 520, 522, respectively (e.g. tracks 546 and 548). Conversely, types two and three corresponding to zero crossings along the positively rising segments of the -PESP and -PESQ curves (not shown).

The position signal is a composite signal formed by stitching together segments of the PESP, PESQ, -PESP and -PESQ curves as determined by track type. For example, when a read head is positioned over the servo bursts within the range zero track type 542, the position signal contribution 552 is obtained from the PESP curve 520. As the head moves into the respective ranges of the type one, type two, and type three tracks 544, 546, 548, the position signal contributions 554, 556, 558 are obtained from the PESQ, -PESP, and -PESQ curves, respectively. In the present example, each segment ideally has maximum and minimum values of +0.25 and −0.25 grey code track widths.

The various contributions are then stitched together at their endpoints to form an ideally linear position signal. Stitching is performed by adding successively increasing vertical offsets, TT0off, TT1off, TT2off and TT3off to each PES contribution as determined by track types. For the specific example provided, TT0off=0, TT1off=0.5, TT2off=1.0, and TT3off=1.5, where these offsets are in terms of grey code track widths. These offsets are added to contributions 552, 554, 556 and 558 to obtain stitched segments 572, 574, 576 and 578 and form a larger segment 580. The larger segments obtained from the described stitching process may them be further stitched at their respective endpoints by adding another offset to each stitched segment. The offset in this case is ideally determined by the absolute track address. It may be obtained from the track identifier in the track ID field or fields, or by processing of the grey code signal. For example, endpoints 590 and 592 would be stitched together, as would endpoints 594 and 596, thus ideally forming a continuous, linear position signal (not shown).

Figure 6:
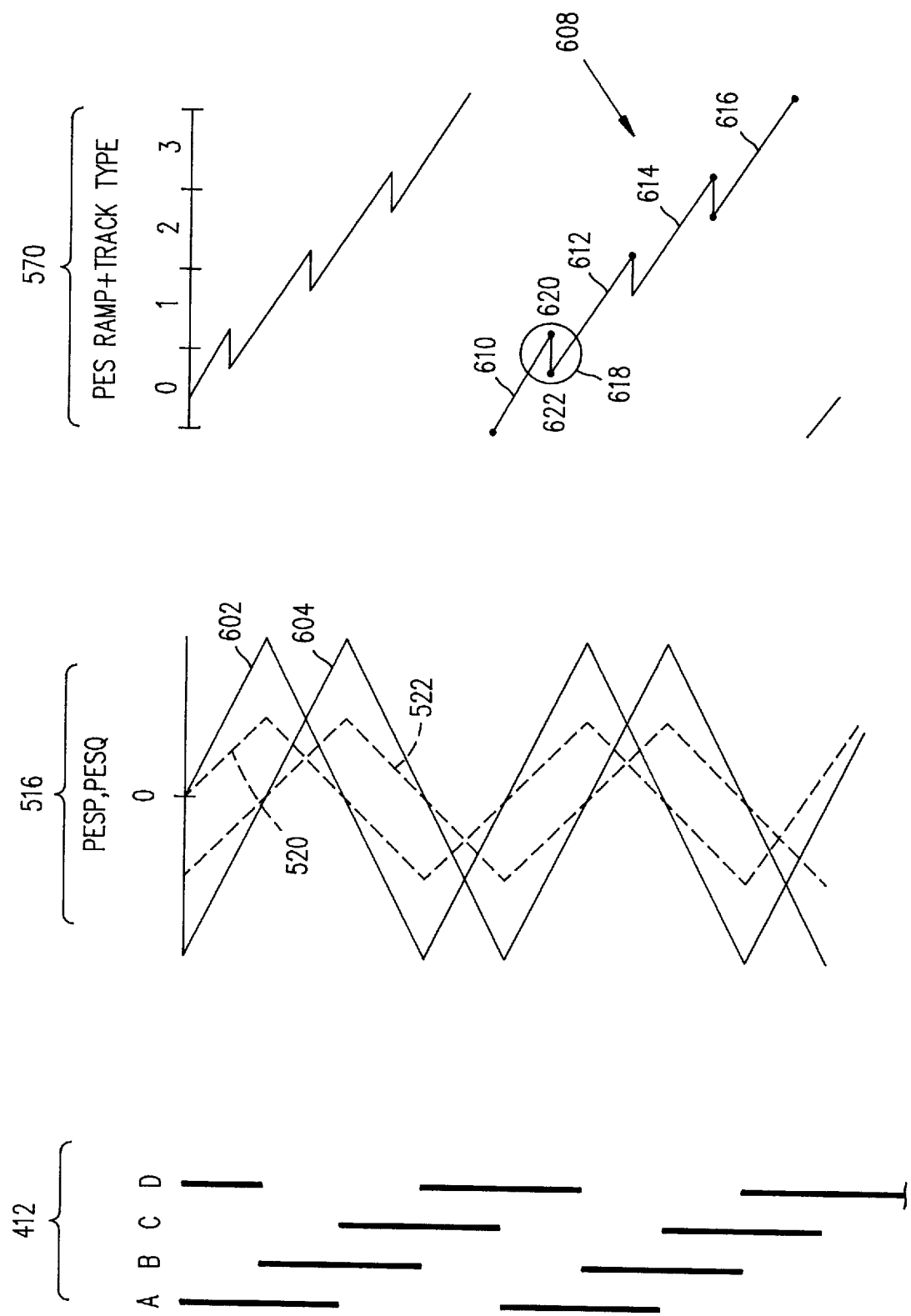
FIGS. 6–8 illustrate sources of discontinuities in a stitched position signal.
Figure 7:
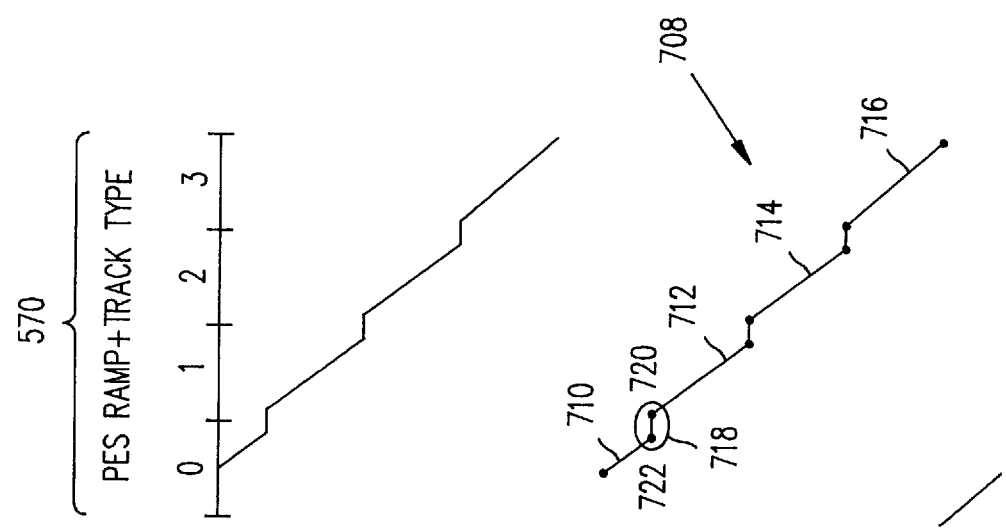
Figure 7:
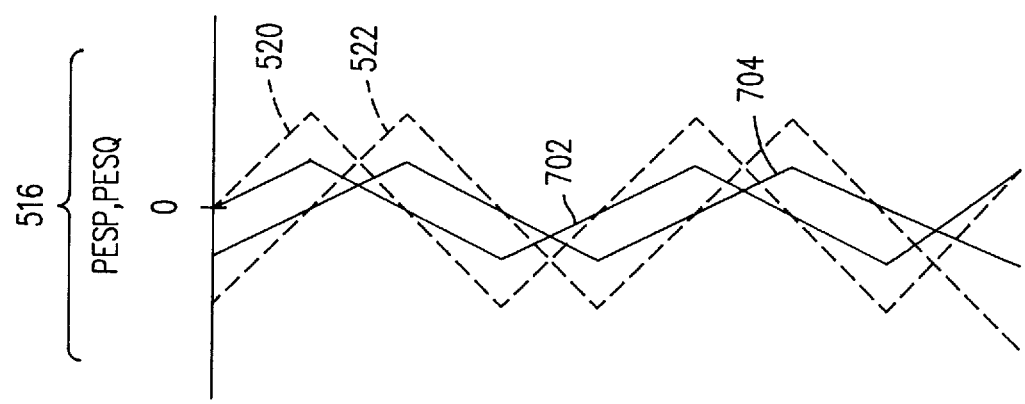
Figure 7:
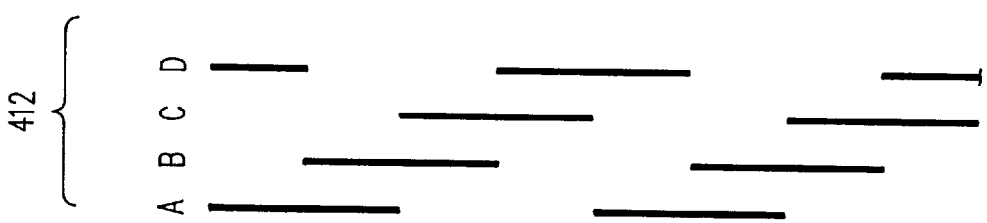

Two previously mentioned causes of discontinuity in the position signal gain errors are introduced by the amplifying stage of the servo detection logic, and inaccuracies in the servo burst patterns. FIGS. 6 and 7 illustrate the first condition. In FIG. 6, the AGC gain is too high, causing the PESP 602 and PESQ 604 signals to have steeper slopes than would the properly adjusted signals (indicated by dashed lines 520, 522). For example, each segment may have maximum and minimum values of ±0.375 grey code track widths, rather than the desired ±0.25 track widths. Consequently, the endpoints of the PESP 610, PESQ 612, -PESP 614 and -PESQ 616 segments do not meet at the stitch points, causing readily apparent discontinuity in the larger segment 608. For example, endpoints 620 and 622 of the first stitch point 618 in larger segment 608 display a significant vertical displacement. When a transducer moves over this stitch point, a small change in its radial position creates relatively large apparent motion in the position signal that carries forward into the servo feedback loop to cause a corresponding error in the control signal. The stitch point discontinuities will also affect stitching of the larger segments.

According to one aspect of the present invention, the discontinuities shown in FIG. 6 may be reduced by saturating PESP and PESQ to a nominal maximum value at the stitch points. The effect of such saturation is to hold the position signal at a constant value over a small radial displacement, as indicated by the dashed lines of larger segment 608, thus eliminating discontinuity at the stitch points.

FIG. 7 illustrates the condition wherein the gain applied to the PESP and PESQ signals 702, 704 is set too low, causing a corresponding decrease in slope from the nominal signals 520, 522. For example, each segment may have maximum and minimum values of ±0.125 grey code track widths, rather than the desired ±0.25 track widths. As a result, the endpoints of the PESP 710, PESQ 712, -PESP 714, and -PESQ segments are once again substantially offset in segment 708. For example, endpoints 720 and 722 are significantly offset in the vertical direction at stitch point 718. Unfortunately, discontinuities resulting from low gain are not correctable by saturating the PESP and PESQ values, as in the preceding example.

Figure 8:
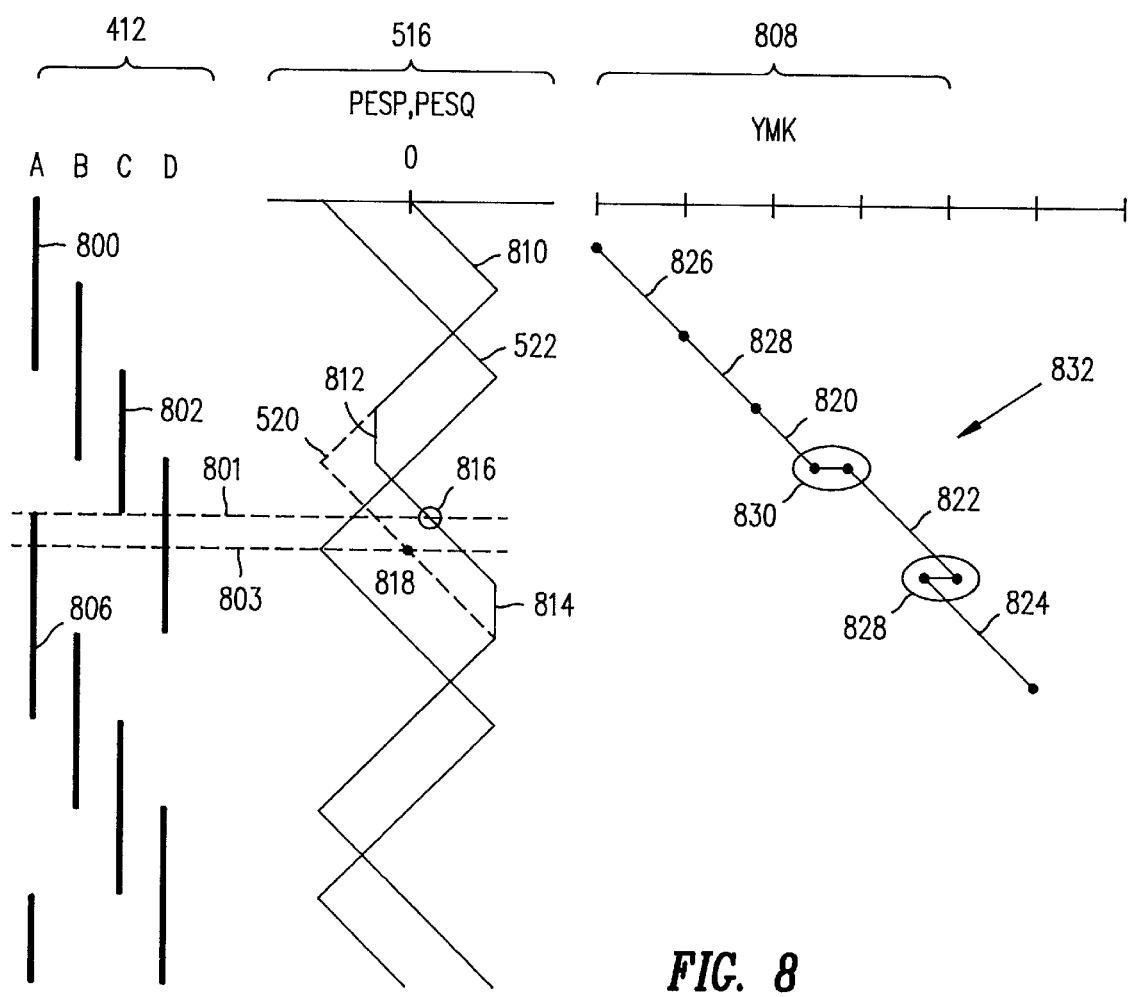

In FIGS. 6 and 7, the actual burst patterns in servo regions 412 remain unchanged from the ideal case of FIG. 5. FIG. 8 illustrates the condition where the bursts themselves are less than ideal due to errors introduced in the servowriting process. In particular, the C burst 802 of the first burst pattern is shorter than the ideal burst length, and the A burst 806 of the next set is too long. Consequently, these bursts align at a radial position 801 that is offset from the ideal radial A=C position 803. Thus the zero-crossing point 816 of the positively sloped PESP signal 810 is offset from the ideal zero-crossing point 818. Moreover, because the C burst is shorter, the PESP signal 810 never reaches its minimum peak, plateauing at 812. Similarly, the PESP signal 810 reaches and maintains its maximum value for an extended time 814 due to the longer A burst. The PESQ signal 522 is unaffected, however, since only the A and C bursts 802, 806 in this example are in error.

The described variations in the PESP signal 818 are manifested in a position signal 832 having discontinuities similar to both low gain and high gain, as illustrated in column 808. Column 808 represents a portion of the composite signal obtained when the PESX ramp, track type and grey code are combined. Here, the PESQ 826 and -PESP 828 segments are unaffected, but the -PESQ 820 segment is shorter than nominal due to the radially shifted crossing point of the PESP and PESQ signals 810, 522, causing translation of the PESP segment 822 position. Consequently, stitch point 830 resembles the low gain conditions of FIG. 7, whereas stitch point 828 is similar to the high gain conditions shown in FIG. 6.

Figure 9:
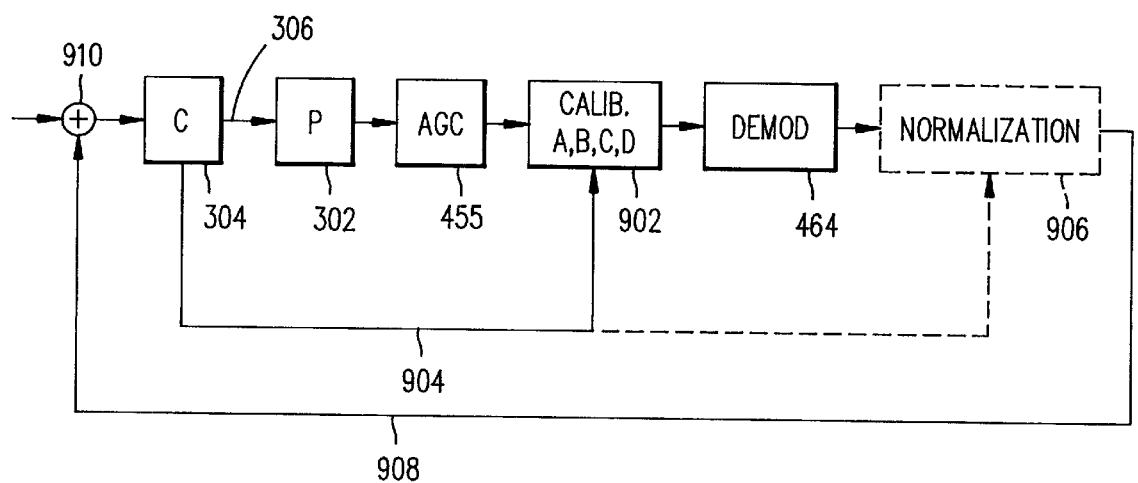
FIG. 9 is a detailed block diagram of a closed loop servo control system according to the preferred embodiment of the present invention.

Discontinuities may be addressed to some extent by further gain adjustment steps of the servo control loop. Referring to FIG. 9, a detailed servo control loop is shown. The AGC circuit 455 serves to amplify the servo signals obtained from the disk surface to a predetermined nominal gain, as previously noted. The gain is adjusted while the transducer is passing over the AGC field 406 of each servo sector. Unfortunately, adjusting the magnitude of the head response does not account for the width of the read element. Read elements having a narrow effective width relative to a nominal head width reach a full magnitude response at a smaller offset to the track center than read elements having a wide effective width. Consequently, although the AGC hardware adjusts for varying head widths by setting their maximum readback signals to a nominal value, there is still a need to calibrate the readback signal to the read head offset to adjust for differences in effective read width (subsequently referred to in terms of an "offset distance to readback signal magnitude", or ODTRSM). It is therefore desirable to provide an adjustment stage 902 at the AGC output to compensate for such gain variations for more reliable PESP and PESQ signals. The adjustment stage is preferably implemented in the control microcode and scales the AGC output (arrow 904) by an adjustment value corresponding to the current track value. This gain adjustment takes place immediately after the servo bursts have been read.

Figure 10:
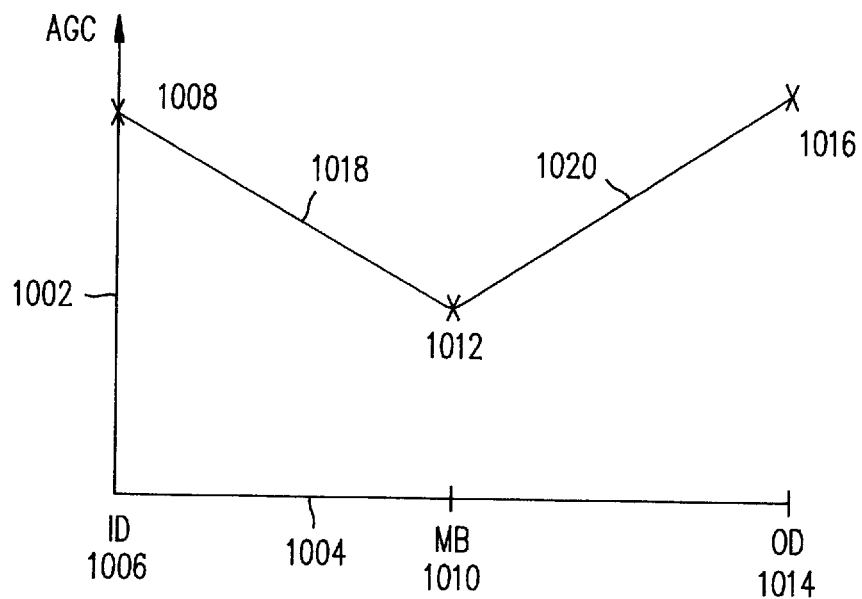
FIG. 10 is a graph illustrating an AGC gain calibration process suitable for use in the servo control system of the preferred embodiment.

The adjustment value for each track is determined in a gain calibration step performed at manufacturing time, at power-up, reset, and/or periodically during the operation of the disk drive. The most accurate calibration process would involve measuring the ODTRSM gain at each track during the calibration process, determining the difference between the actual gain and a nominal gain, and storing the resulting ratio in memory. However, this approach is both time consuming and memory intensive. Alternatively, an interpolation process is used, as illustrated by FIG. 10. FIG. 10 shows a graph wherein the vertical axis 1002 represents ODTRSM gain adjustment, and the horizontal axis 1004 represents radial actuator position. Rather than measuring gain at each track, measurements are only taken at selected radial positions. Preferably, these radial positions comprise the inner diameter (ID) 1006, outer diameter (OD) 1014, and a midband (MB) position 1010, and result in sample gains 1008, 1012 and 1016. A calibration curve having two linear sections 1018 and 1020 is obtained by interpolating between the sample points. An adjustment value is then obtained by calculating the ratio between the interpolated ODTRSM gain for that track and a nominal ODTRSM value. Referring back to FIG. 9, this adjustment then scales the AGC output signal in stage 902 prior to demodulation 464. According to a first aspect of the present invention, the servo control loop also includes a normalization stage 906 following the demodulation stage 464, as indicated by the dashed lines. Before proceeding to a discussion of the present invention, however, the importance of providing a continuous position signal in current and future generations of storage devices must be emphasized.

Figure 11:
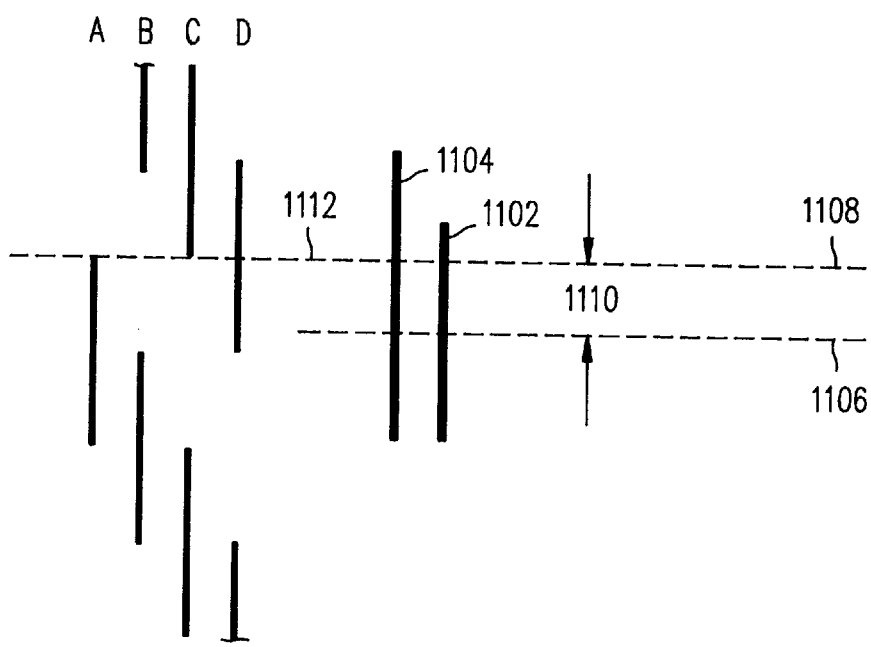
FIG. 11 is a representation of a dual-element MR head wherein the center of the read element is offset with respect to the center of the write element and the track center.

Continuity of the position signal is particularly important in storage devices utilizing magnetoresistive read elements, as illustrated in FIG. 11. Present-day MR transducers are dual-element structures comprising an MR read element 1102 and an inductive write element 1104. The centers 1108, 1106 of these elements are usually offset from one another by some amount 1110 due to tolerances in the head fabrication process. This offset 1110 is typically determined in a calibration process and is incorporated into the servo microcode. As the skilled artisan will understand, writing involves essentially simultaneous read and write operations. That is, the read head 1102 servoes on the offset track 1110 as the write head 1104 writes information to the disk at a position offset from the read head 1102, i.e. the data track center 1112. During a read operation, the read head 1102 servoes to the center of the data track 1112, at a position offset from its previous servo position during writing. Consequently, during writing, the read head 1102 may servo at or near a stitch point. Any nonlinearities at the stitch point will adversely affect the positioning of the write head 1104, especially as the number of tracks per inch (TPI) increases, and large discontinuities such as those described with reference to FIGS. 6–8 will cause undesirable motion of the actuator arm.

The present invention provides a servo system and method for generally correcting nonlinearity of a position signal, and for correcting discontinuities of a stitched position signal at its stitch points with minimal impact to its value at track center and other zero-crossing points. Referring back to FIG. 9, a normalization stage 906 is provided at the output of demodulator 464. Normalization is the process of correcting the gain and linearity of a position signal. In particular it allows the removal of discontinuities at stitch points. The normalization stage is preferably implemented in the control microcode as part of the servo control process and renders the calibration stage 902 optional. According to a first preferred embodiment of the present invention, normalization is applied using an algorithm determined by the width of the read transducer. According to a second preferred embodiment, normalization is selectively applied at radial transducer positions near the stitch points of the position signal, but is not applied at radial positions near the zero-crossing points. In a third preferred embodiment of the present invention, a first normalization algorithm is applied near the stitch points and a second normalization algorithm is applied at the zero-crossings. In a fourth preferred embodiment, a smoothing function is applied at radial positions between the stitch points and zero-crossings to smooth the transition from normalized to unnormalized signal contributions or from signal contributions normalized in a first manner to signal contributions normalized in a second manner. A further aspect of the present invention is to saturate the PES at each stitch point where the gain calibrated PES is determined to be higher than a nominal value.

Each of the preferred embodiments includes a normalization step that is preferably executed on a sector by sector basis as part of the servo control process. In a quad-burst architecture environment, the algorithm is generally represented by the following equation:

$$PESP'=f_1(PESP,PESQ) \quad (3)$$

$$PESQ'=f_2(PESP,PESQ) \quad (4)$$

As an example of the broad scope of the present invention, it is instructive to consider a servo architecture different from the traditional quad-burst environment, such as a dual burst environment. A dual burst architecture is analogous to a quad burst pattern without the B and D bursts, thus producing only a single position error similar to the PESP signal. Under these conditions, the final position signal comprises two stitched components, PESP and -PESP, and controller 304 of FIG. 9 determines which component to use for the current radial position in a manner similar to the quad-burst implementation. However, normalization cannot be carried out according to the previously described algorithms, since only one position error signal is available. To accommodate for these conditions, the controller alternatively observes changes in the position signal near stitch points of PESP and -PESP to determine how best to calibrate the A and C bursts to reduce any discontinuities at the stitch points. This information is communicated to the calibration block 902 via communication link 904.

Figure 12A:
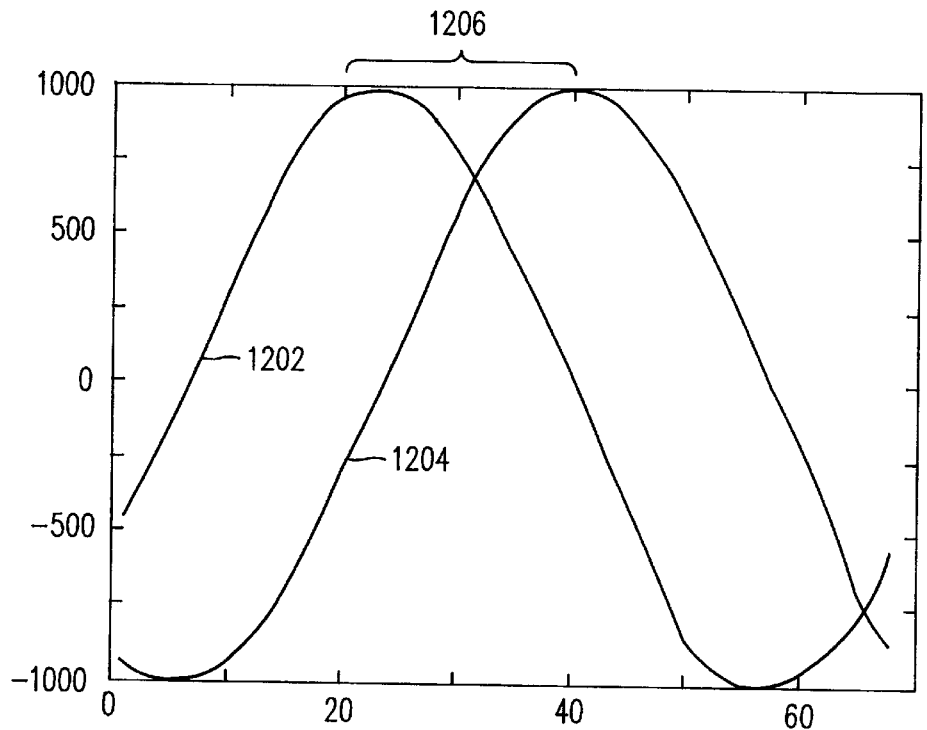
Figure 12B:
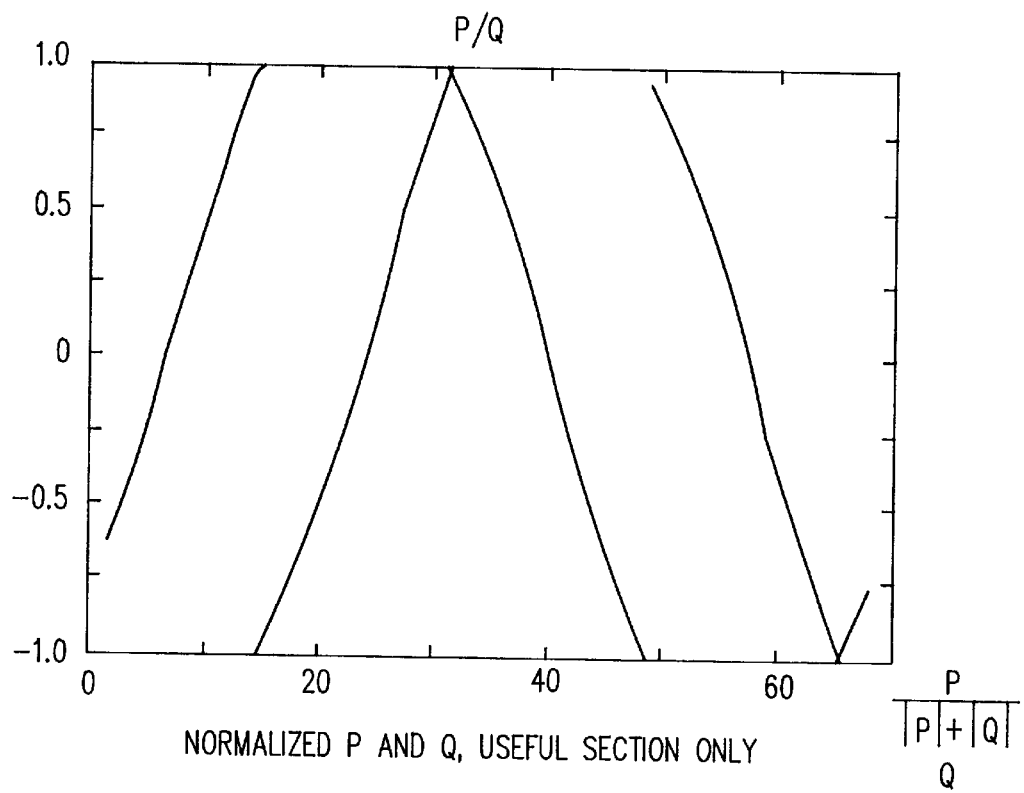

Returning to a quad-burst environment, if the read transducer has a wide read width, it will sense a larger radial section of the servo bursts and will produce the PESP 1202 and PESQ 1204 signals of FIG. 12A. These signals include substantially linear portions, but characteristically drop off in a curve at their peaks. Under these circumstances, the sum of the absolute values of PESP and PESQ is approximately constant, and can be used to normalize the signals. An example of an appropriate normalization function is:

$$PESX' = PESX * \frac{|PESP_{nom}| + |PESQ_{nom}|}{|PESP| + |PESQ|} \quad (5)$$

where $PESP_{nom}$ and $PESQ_{nom}$ are the ideal PESP and PESQ amplitude values at any stitch point, and PESP and PESQ are the actual amplitude values, all in units of data track width. For the specific embodiment described above, the sum $|PESP_{nom}|+|PESQ_{nom}|$ is equal to 0.5 grey code tracks. The results of such normalization are shown in FIG. 12B.

The PESP 1302 and PESQ 1304 signals for a transducer having a narrow read head are shown in FIG. 13A. The PES signals tend to be flat at their peaks, i.e. when the read transducer is centered on a servo burst. Under these conditions, it is more desirable to normalize the position error signals using either PESP or PESQ. One example of such a function is shown below:

$$PESP' = PESP * \frac{|PESQ_{nom}|}{|PESQ|} \quad (6)$$

$$PESQ' = PESQ * \frac{|PESP_{nom}|}{|PESP|} \quad (7)$$

The results of such normalization are shown in FIG. 13B.

To implement any of the preceding normalization algorithms in a processor, first or second order polynomial approximations of the functions can be used in a manner generally familiar to those of ordinary skill in the art.

A further refinement of either scheme above is possible. The values $G(t)=(|PESP_{nom}|+|PESQ_{nom}|)/(|PESP|+|PESQ|)$ or $G(t)=|PESP_{nom}|/PESP$ or $G(t)=|PESQ_{nom}|/|PESQ|$ are the amount of gain that has to be applied at time t to PESP or PESQ such that $G(t)*PESP=G(t)*PESQ+offset$. (That is, G(t) is the amount of gain needed to eliminate the discontinuity at the stitch point.) It may be desirable to average G(t) over a number of sectors to reduce the effect of a single sector error. In such a scheme, the controller keeps a running average or filtered value of this needed gain via such an equation as:

$$G'(t)=\alpha*G'(t-1)+(1-\alpha)*G(t) \quad (8)$$

Here $\alpha$ is a number between zero and one, and G'(t) represents the averaged gain adjustment. If a is equal to zero, then there is no averaging, and the scheme is as previously described. If $\alpha$ is equal to one, then there is no normalization, and all gain adjustment is done in the calibration block 902. The averaged gain adjustment value G'(t) is communicated to the normalization block 906 via communication link 904, as indicated in FIG. 9 by the dashed line. Then, $$PESX'=G'(t)*PESX. \quad (9)$$

The normalization algorithms presented above are well-suited to the particular cases of wide and narrow read widths relative to the servo burst patterns. However, for heads having widths between these two extremes, normalization causes nonlinearities near the zero-crossing regions. A second preferred embodiment is therefore presented wherein normalization is only applied to the PES signals in a selected range of radial positions including each stitch point. Implementation of this embodiment preferably involves two steps. In a first step, a normalized value, PESX', is calculated at the current radial position of the head as previously described. In a next step, PESX' and PESX are incorporated into the following function to obtain the position error signal to be used in generating the ultimate position signal:

$$PESX_{new}=PESX'*f_3(PESX)+PESX*\{1-f_3(PESX)\} \quad (10)$$

where f(n) is a function having a value of or very close to zero in the region of each PESX zero crossing, and a value of or very close to one in the region of each stitch point. The value of PESX at a stitch point is ideally equal to 0.25 for the present example. Accordingly, one example of a suitable function is:

$$f_3(x) = \begin{cases} 0 & 0 \leq x < 0.125 \\ 1 & 0.125 < x \leq 0.25 \end{cases} \quad (11)$$

where x is approximated by the PES value. A similar equation is used when x has a negative value. For convenience, the switch from actual to normalized PES has been selected to occur at a radial transducer position midway between the stitch point and the zero crossing point of each PES segment. It should be apparent, however, that the switchover point may be adjusted so that normalization is applied to a smaller or larger range of radial positions including the stitch points, as desired.

As an alternative to function (11), different normalization algorithms may be applied at the stitch and zero-crossing points. For example, function (5) is applied at the zero-crossings, and equations (6) and (7) are applied at the zero-crossings. Thus the two-step process would be redefined as follows: in a first step, PESX' and PESX" are calculated, where PESX' corresponds to a PESX value normalized according to a first normalization algorithm, and PESX" corresponds to a PESX value normalized according to a second normalization algorithm. Function (10) is then rewritten as:

$$PESX_{new} = PESX'* f_3(PESX) + PESX''*\{1-f_3(PESX)\} \quad (12)$$

Functions (11) and (12) are adequate when the values for PES and PES' are anticipated to be close enough in value not to cause significant discontinuity at the switchover point. However, if the PES and PES' values (or the PES' and PES" values) differ significantly from one another in these regions, application of these functions will introduce discontinuities at the switchover points unless additional compensation is provided. In such circumstances, and according to a fourth preferred embodiment of the present invention, a smoothing function is incorporated into $f_3(x)$ to produce a smooth transition between PESX to PESX' (or PESX' and PESX") at each switching point. For example, the preceding function may be modified as shown below:

$$f_3(x) = \begin{cases} 0 & 0/12 \leq x < 1/12 \\ (12x-1) & 1/12 \leq x < 2/12 \\ 1 & 2/12 \leq x < 3/12 \end{cases} \quad (13)$$

Again, a similar equation is used when x is negative.

The preceding steps will now be applied to a specific example to illustrate correction of discontinuities resulting from low AGC gain, or similar discontinuities caused by variations in the burst patterns themselves. For purposes of this example, the position signal is designated YMK and comprises the sum of information obtained from the grey code, the track type, and the appropriate PESX. The gain factor of the gain calibration process is simply designated as AGC. It will be assumed for convenience that the value obtained from the grey code is zero and that the present transducer position is at a zero track type moving radially toward a type one track. While the transducer is within the range of the stitch point and within the zero track type, the value of YMK is defined as:

$$YMK = AGC*PESP \quad (14)$$

When the transducer crosses into the next track type, YMK is thereafter defined as:

$$YMK = 0.5 + AGC*PESQ, \quad (15)$$

for as long as the transducer remains near the stitch point and in the radial range of the type one track, since PESX=PESQ and the offset for a type one track is 0.5 grey code track widths. At the stitch between track types zero and one, ideally, $$AGC*PESP = 0.5 + AGC*PESQ \quad (16)$$
$$= 0.5 - 0.25 = 0.25$$

So PESP and PESQ are equal at the stitch points. Assuming a low AGC gain, however, the actual products will be lower, e.g.:

$$AGC*PESP = 0.5 - AGC*PESQ = 0.20 \quad (17)$$

at the stitch point. Under these conditions, when the transducer moves from a track type zero to a track type one, it will appear to the servo control system that the transducer is moving from 0.2 grey code tracks to 0.3 grey code tracks because YMK=0.5−0.2=0.3 grey code tracks. The low gain therefore produces a substantial discontinuity of 0.1 grey code track and adversely affects the servo performance. This effect arises because a minute change of position appears as a motion of 0.1 grey code tracks, provoking a vigorous servo response. This response, in turn, induces real and undesirable motion.

Applying the normalization step to the present example, the products AGC*PESP and AGC*PESQ are scaled by the normalization factor. For purposes of the present invention, the normalization factor is derived from equation (7), i.e., 0.5/(|PESP|+|PESQ|). For track type zero:

$$YMK = PESP*AGC*\frac{0.5}{|PESP|+|PESQ|} = 0.2*\frac{0.5}{0.4} = 0.25, \quad (18)$$

and for track type one:

$$YMK = 0.5 + PESQ*AGC*\frac{0.5}{|PESP|+|PESQ|} \quad (19)$$
$$= 0.5 + (-0.2)*\frac{0.5}{0.4} = 0.25$$

Thus by applying normalization for radial transducer position near the stitch point, discontinuity at the stitch point is eliminated.

Were normalization to occur in the vicinity of the zero crossing points, however, the slope of YMK would be altered by as much as 30%. For example, it will be assumed that the read head has a narrow effective width relative to a nominal width. As a result, if PESP has a value of 0.01 near its zero-crossing point, PESQ may have a value of 0.39 rather than the nominal value of 0.49. This deviation is due to flattening of the PESQ curve as was illustrated in FIG. 13A. Consequently:

$$YMK = PESP*AGC*\frac{0.5}{|PESP|+|PESQ|} = 0.01*\frac{0.5}{0.4} = 0.0125, \quad (20)$$

Under these circumstances, application of the normalization step introduces a 25% error. The variation in slope is explained by the fact that the sum |PESP|+|PESQ| does not remain constant radially, but rather reaches a maximum value at the stitch point and a minimum value at the zero crossing. The minimum is determined by the read head width and is therefore not easily corrected. By using function $f_3(x)$ as defined in equation (13) in the determination of YMK, the gain of the servo system is not normalized in the vicinity of the zero crossing points and YMK is not adversely affected.

According to the alternative embodiment, PESX is normalized at the zero-crossing points, but normalization is performed using a different algorithm selected to reduce nonlinearity in this region. Examples of normalization factors include $PESX*[(A_{nom}+B_{nom})/(A+B)]$ and $PESX*[(A_{nom}+B_{nom}+C_{nom}+D_{nom})/(A+B+C+D)]$. These particular algorithms do not adjust for discontinuity at the stitch points, but do provide a linear signal at the zero-crossings and further eliminate the need for a separate calibration stage.

A number of specific embodiments have been described encompassing the present invention. Nevertheless, it will be understood that various modifications may become apparent to those having ordinary skill in the art of servo control in a storage device without departing from the spirit and the scope of the present invention. Accordingly, it is to be understood that the invention is not to be limited by the specific illustrated embodiments, but only by the scope of the appended claims.

We claim:

1. A method for generating a position signal for controlling the position of a transducer with respect to a storage surface, the storage surface including positioning information, comprising the steps of:

sensing the positioning information;

producing at least a first position signal from the positioning information wherein the first position signal includes first and second position signal components; and normalizing the first position signal according to a predetermined algorithm to produce a second position signal for use in controlling the transducer position and correcting for discontinuities at stitch points, wherein the second position signal is produced by stitching together the first and second position signal components.

2. The method of claim 1, wherein the first position signal comprises a repeating pattern.

3. The method of claim 1, wherein the transducer comprises a read element, and wherein the normalization algorithm is determined by the effective width of the read element relative to a nominal read width.

4. The method of claim 1, wherein the positioning information comprises a quadrature burst pattern.

5. The method of claim 4, wherein the at least first position signal comprises a primary signal and a quadrature signal.

6. The method of claim 5, wherein the normalization step further comprises dividing the primary signal by the sum of the primary signal and the quadrature signal.

7. The method of claim 6, wherein the normalization step further comprises multiplying the primary signal by a factor comprising a sum of a nominal primary signal value and a nominal quadrature value divided by a sum of the absolute value of the primary signal and the absolute value of the quadrature signal.

8. The method of claim 5, wherein the normalization step further comprises dividing the quadrature signal by the sum of the primary signal and the quadrature signal.

9. The method of claim 8, wherein the normalization step further comprises multiplying the quadrature signal by a factor comprising the sum of a nominal primary quadrature value and a nominal quadrature signal value divided by a sum of the absolute value of the primary signal and the absolute value of the quadrature signal.

10. The method of claim 5, wherein the normalization step further comprises dividing the primary signal by the quadrature signal.

11. The method of claim 10, wherein the normalization step further comprises multiplying the primary signal by a factor comprising a nominal quadrature signal value divided by the absolute value of the quadrature signal.

12. The method of claim 5, wherein the normalization step further comprises dividing the quadrature signal by the primary signal.

13. The method of claim 12, wherein the normalization step further comprises multiplying the quadrature signal by a factor comprising a nominal primary signal value divided by the absolute value of the primary signal.

14. The method of claim 1, wherein the predetermined algorithm comprises multiplying a value of the first position signal by a function of the first position signal comprising a determined average gain.

15. The method of claim 1, wherein the positioning information further comprises information indicative of an absolute transducer position.

16. The method of claim 15, wherein the first position signal comprises a plurality of position signal components, and wherein the second position signal is produced by stitching together the plurality of position signal components and the absolute position information.

17. The method of claim 1 wherein the storage surface comprises the surface of a rotatable storage disk.

18. The method of claim 17, wherein the storage surface comprises a dedicated servo disk surface.

19. The method of claim 17, wherein the storage surface comprises an embedded servo disk surface.

20. The method of claim 17, wherein the positioning information comprises a plurality of servo sectors, and wherein the normalization step is performed on a sector-by-sector basis.

21. The method of claim 1, wherein the position of the transducer relative to the storage surface is controlled by a servo loop responsive to the second position signal.

22. The method of claim 21, wherein the servo loop further comprises a variable gain circuit for amplifying the first position signal and a normalization stage for selectively normalizing portions of the amplified first position signal.

23. The method of claim 22, wherein the servo loop further comprises a calibration stage between the variable gain circuit and the normalization stage for adjusting the gain of the amplified first position signal.

24. A method for generating a position signal for controlling the position of a transducer with respect to a storage surface, the storage surface including positioning information, comprising the steps of:

(a) sensing the positioning information;

(b) producing at least a first position signal from the positioning information wherein the first position signal includes first and second position signal components and corresponds to a range of transducer positions relative to the storage surface; and (c) only normalizing a portion of the first position signal corresponding to a range of positions about the stitching point according to a predetermined algorithm to produce a second position signal for use in controlling the transducer position wherein the second position signal is produced by stitching together the first and second position signal components.

25. The method of claim 24, further comprising the step of applying a smoothing function to a portion of the first position signal adjacent to the normalized portion to reduce discontinuities in the second position signal.

26. A method for generating a position signal for controlling the position of a transducer with respect to a storage surface, the storage surface including positioning information, comprising the steps of:

(a) sensing the positioning information;

(b) producing at least a first position signal from the positioning information wherein the first position signal includes first and second position signal components and corresponds to a range of transducer positions relative to the storage surface; and (c) normalizing the first position signal according to a predetermined algorithm to produce a second position signal for use in controlling the transducer position wherein the second position signal is produced by stitching together the first and second position signal components and wherein the predetermined algorithm includes the steps of:

(1) applying a first normalizing algorithm to a first portion of the first position signal; and (2) applying a second normalizing algorithm to a second portion of the first position signal.

27. The apparatus of claim 26, wherein the first position of the signal corresponds to a range of transducer positions about the stitching point.

28. The method of claim 27, wherein the first position signal comprises at least one zero-crossing point.

29. The method of claim 28, wherein the second portion of the first position signal corresponds to a range of transducer positions about the zero-crossing point.

30. The method of claim 26, further comprising the step of applying a smoothing function to a third portion of the first position signal between the first and second portions to reduce discontinuities in the second position signal.

31. A method for generating a position signal for controlling the position of a transducer with respect to a storage surface, the storage surface including positioning information, comprising the steps of:

(a) sensing the positioning information;

(b) producing at least a first position signal from the positioning information wherein the first position signal includes first and second position signal components and has a measurable maximum amplitude;

(c) normalizing the first position signal according to a predetermined algorithm to produce a second position signal for use in controlling the transducer position wherein the second position signal is produced by stitching together the first and second position signal components (d) determining the maximum amplitude of the first position signal; and (e) if the maximum amplitude exceeds a predetermined nominal maximum amplitude, limiting the amplitude of the first position signal to the nominal maximum amplitude about a stitching point.

32. An apparatus for generating a position signal, comprising:

a storage surface including positioning information;

a transducer controllably positionable with respect to the storage surface and capable of sensing the positioning information;

a signal generating stage for receiving the sensed positioning information and producing therefrom at least a first position signal wherein the first position signal includes first and second position signal components;

a normalizing stage for receiving and processing the first position signal according to a predetermined algorithm to produce a second position signal for use in controlling the transducer position and correcting for discontinuities at the stitch points, wherein the second position signal is produced by stitching together the first and second position signal components.

33. The apparatus of claim 32, wherein the positioning information, and the at least first position signal each comprise a repeating pattern.

34. The apparatus of claim 32, wherein the transducer comprises a read element, and wherein the normalization algorithm is determined by the effective width of the read element relative to a nominal read width.

35. The apparatus of claim 32, wherein the positioning information comprises a quadrature burst pattern.

36. The apparatus of claim 35, wherein the at least first position signal comprises a primary signal and a quadrature signal.

37. The apparatus of claim 36, wherein the normalization step further comprises dividing the primary signal by the sum of the primary signal and the quadrature signal.

38. The apparatus of claim 37, wherein the normalization step further comprises multiplying the primary signal by a factor comprising a sum of a nominal primary signal value and a nominal quadrature signal value divided by a sum of the absolute value of the primary signal and the absolute value of the quadrature signal.

39. The apparatus of claim 36, wherein the normalization step further comprises dividing the quadrature signal by the sum of the primary signal and the quadrature signal.

40. The apparatus of claim 39, wherein the normalization step further comprises multiplying the quadrature signal by a factor comprising a sum of a nominal primary signal value and a nominal quadrature signal value divided by the sum of the absolute value of the primary signal and the absolute value of the quadrature signal.

41. The apparatus of claim 36, wherein the normalization step further comprises dividing the primary signal by the quadrature signal.

42. The apparatus of claim 41, wherein the normalization step further comprises multiplying the primary signal by a factor comprising a nominal quadrature signal value divided by the absolute value of the quadrature signal.

43. The apparatus of claim 36, wherein the normalization step further comprises dividing the quadrature signal by the primary signal.

44. The apparatus of claim 43, wherein the normalization step further comprises multiplying the quadrature signal by a factor comprising a nominal primary signal value divided by the absolute value of the primary signal.

45. The apparatus of claim 32, wherein the predetermined algorithm comprises multiplying a value of the first position signal by a function of the first position signal comprising a determined average gain.

46. The apparatus of claim 32, wherein the positioning information further comprises information indicative of an absolute transducer position.

47. The apparatus of claim 46, wherein the first position signal comprises a plurality of position signal components, and wherein the second position signal is produced by stitching together the plurality of position signal components and the absolute position information.

48. The apparatus of claim 32, wherein the storage surface comprises the surface of a rotatable storage disk.

49. The apparatus of claim 48, wherein the storage surface comprises a dedicated servo disk surface.

50. The apparatus of claim 48, wherein the storage surface comprises an embedded servo disk surface.

51. The apparatus of claim 48, wherein the positioning information comprises a plurality of servo sectors, and wherein the normalizing stage performs normalization of the first position signal on a sector-by-sector basis.

52. The apparatus of claim 32, further comprising a servo control loop, including the normalizing stage, responsive to the second position signal for controlling the transducer relative to the storage surface.

53. The apparatus of claim 52, wherein the servo control loop further comprises a variable gain circuit for amplifying the first position signal prior to normalization.

54. The apparatus of claim 53, wherein the servo control loop further comprises a calibration stage between the variable gain circuit and the normalization stage for adjusting the gain of the amplified first position signal prior to normalization.

55. An apparatus for generating a position signal, comprising:
 a storage surface including positioning information;
 a transducer controllably positionable with respect to the storage surface and capable of sensing the positioning information;
 a signal generating stage for receiving the sensed positioning information and producing therefrom at least a first position signal wherein the first position signal includes first and second position signal components and corresponds to a range of transducer positions relative to the storage surface; and
 a normalizing stage for receiving and processing the first position signal according to a predetermined algorithm to produce a second position signal for use in controlling the transducer position wherein the second position signal is produced by stitching together the first and second position signal components and wherein the normalizing stage selectively normalizes only a portion of the first position signal corresponding to a range of positions about a stitching point.

56. The apparatus of claim 55, further comprising the step of applying a smoothing function to a portion of the first position signal adjacent to the normalized portion to reduce discontinuities in the second position signal.

57. An apparatus for generating a position signal, comprising:
 a storage surface including positioning information;
 a transducer controllably positionable with respect to the storage surface and capable of sensing the positioning information;
 a signal generating stage for receiving the sensed positioning information and producing therefrom at least a first position signal wherein the first position signal includes first and second position signal components and corresponds to a range of transducer positions relative to the storage surface; and
 a normalizing stage for receiving and processing the first position signal according to a predetermined algorithm to produce a second position signal for use in controlling the transducer position wherein the second position signal is produced by stitching together the first and second position signal components and wherein the normalizing stage selectively normalizes a first portion of the at least one first position signal according to a first predetermined algorithm, and selectively normalizes a second portion of the at least one first position signal according to a second predetermined algorithm.

58. The apparatus of claim 57, wherein the first position of the signal corresponds to a range of transducer positions about the stitching point.

59. The apparatus of claim 58, wherein the first position signal comprises at least one zero-crossing point.

60. The apparatus of claim 59, wherein the second portion of the first position signal corresponds to a range of transducer positions about the zero-crossing point.

61. The apparatus of claim 57, further comprising the step of applying a smoothing function to a third portion of the first position signal between the first and second portions to reduce discontinuities in the second position signal.

62. An apparatus for generating a position signal, comprising:
 a storage surface including positioning information;
 a transducer controllably positionable with respect to the storage surface and capable of sensing the positioning information;
 a signal generating stage for receiving the sensed positioning information and producing therefrom at least a first position signal wherein the first position signal includes first and second position signal components and has a measurable maximum amplitude;
 a normalizing stage for receiving and processing the first position signal according to a predetermined algorithm to produce a second position signal for use in controlling the transducer position wherein the second position signal is produced by stitching together the first and second position signal components; and
 a saturation stage for determining the maximum amplitude of the first position signal, and if the maximum amplitude exceeds a predetermined nominal maximum amplitude, limiting the amplitude of the first position signal to the nominal maximum amplitude about the stitching point.

63. A storage device, comprising:
 a storage surface including positioning information;
 a transducer controllably positionable with respect to the storage surface and capable of sensing the positioning information;
 a servo control system for controlling the position of the transducer relative to the storage surface, comprising,
  a signal generating stage for receiving the sensed positioning information and producing therefrom at least a first position signal wherein the first position signal includes first and second position signal components,
  a normalizing stage for receiving and processing the first position signal according to a predetermined algorithm to produce a second position signal wherein the second position signal is produced by stitching together the first and second position signal components and corrects for discontinuities at the stitch points, and
  a controller responsive to the second position signal for producing a control signal to control the transducer position.

64. The storage device of claim 63, wherein the positioning information, and the at least first position signal each comprise a repeating pattern.

65. The storage device of claim 63, wherein the transducer comprises a read element, and wherein the normalization algorithm is determined by the effective width of the read element relative to a nominal read width.

66. The storage device of claim 63, wherein the positioning information comprises a quadrature burst pattern.

67. The storage device of claim 66, wherein the at least first position signal comprises a primary signal and a quadrature signal.

68. The storage device of claim 67, wherein the normalization step further comprises dividing the primary signal by the sum of the primary signal and the quadrature signal.

69. The storage device of claim 68, wherein the normalization step further comprises multiplying the primary signal by a factor comprising a sum of a nominal primary signal value and a nominal quadrature signal value divided by the sum of the absolute value of the primary signal and the absolute value of the quadrature signal.

70. The storage device of claim 67, wherein the normalization step further comprises dividing the quadrature signal by the sum of the primary signal and the quadrature signal.

71. The storage device of claim 70, wherein the normalization step further comprises multiplying the quadrature signal by a factor comprising a sum of a nominal quadrature signal value and a nominal quadrature signal value divided by the sum of the absolute value of the primary signal and the absolute value of the quadrature signal.

72. The storage device of claim 67, wherein the normalization step further comprises dividing the primary signal by the quadrature signal.

73. The storage device of claim 72, wherein the normalization step further comprises multiplying the primary signal by a factor comprising a nominal quadrature signal value divided by the absolute value of the quadrature signal.

74. The storage device of claim 67, wherein the normalization step further comprises dividing the quadrature signal by the primary signal.

75. The storage device of claim 74, wherein the normalization step further comprises multiplying the quadrature signal by a factor comprising a nominal primary signal value divided by the absolute value of the primary signal.

76. The storage device of claim 63, wherein the predetermined algorithm comprises multiplying a value of the first position signal by a function of the first position signal comprising a determined average gain.

77. The storage device of claim 63, wherein the positioning information further comprises information indicative of an absolute transducer position.

78. The storage device of claim 77, wherein the first position signal comprises a plurality of position signal components, and wherein the second position signal is produced by stitching together the plurality of position signal components and the absolute position information.

79. The storage device of claim 63, wherein the storage surface comprises the surface of a rotatable storage disk.

80. The storage device of claim 79, wherein the storage surface comprises a dedicated servo disk surface.

81. The storage device of claim 79, wherein the storage surface comprises an embedded servo disk surface.

82. The storage device of claim 79, wherein the positioning information comprises a plurality of servo sectors, and wherein the normalizing stage performs normalization of the first position signal on a sector-by-sector basis.

83. The storage device of claim 63, further comprising a servo control loop, including the normalizing stage, responsive to the second position signal for controlling the transducer relative to the storage surface.

84. The storage device of claim 83, wherein the servo control loop further comprises a variable gain circuit for amplifying the first position signal prior to normalization.

85. The storage device of claim 84, wherein the servo control loop further comprises a calibration stage between the variable gain circuit and the normalization stage for adjusting the gain of the amplified first position signal prior to normalization.

86. The disk drive of claim 63, wherein normalization is performed during reading and writing operations of the storage device.

87. A storage device, comprising:
a storage surface including positioning information;
a transducer controllably positionable with respect to the storage surface and capable of sensing the positioning information;
a servo control system for controlling the position of the transducer relative to the storage surface, comprising,
a signal generating stage for receiving the sensed positioning information and producing therefrom at least a first position signal wherein the first position signal includes first and second position signal components and corresponds to a range of transducer positions relative to the storage surface,
a normalizing stage for receiving and processing the first position signal according to a predetermined algorithm to produce a second position signal and wherein the second position signal is produced by stitching together the first and second position signal components, and wherein the normalizing stage selectively normalizes only a portion of the first position signal corresponding to a range of positions about the stitching point, and
a controller responsive to the second position signal for producing a control signal to control the transducer position.

88. The storage device of claim 87, further comprising the step of applying a smoothing function to a portion of the first position signal adjacent to the normalized portion to reduce discontinuities in the second position signal.

89. A storage device, comprising:
a storage surface including positioning information;
a transducer controllably positionable with respect to the storage surface and capable of sensing the positioning information;
a servo control system for controlling the position of the transducer relative to the storage surface, comprising,
a signal generating stage for receiving the sensed positioning information and producing therefrom at least a first position signal wherein the first position signal includes first and second position signal components and corresponds to a range of transducer positions relative to the storage surface
a normalizing stage for receiving and processing the first position signal according to a predetermined algorithm to produce a second position signal and wherein the second position signal is produced by stitching together the first and second position signal components, and wherein the normalizing stage selectively normalizes a first portion of the at least one first position signal according to a first predetermined algorithm, and selectively normalizes a second portion of the at least one first position signal according to a second predetermined algorithm, and
a controller responsive to the second position signal for producing a control signal to control the transducer position.

90. The storage device of claim 89, wherein the first position of the signal corresponds to a range of transducer positions about the stitching point.

91. The storage device of claim 90, wherein the first position signal comprises at least one zero-crossing point.

92. The storage device of claim 91, wherein the second portion of the first position signal corresponds to a range of transducer positions about the zero-crossing point.

93. The storage device of claim 89, further comprising the step of applying a smoothing function to a third portion of the first position signal between the first and second portions to reduce discontinuities in the second position signal.

94. A storage device, comprising:
a storage surface including positioning information;
a transducer controllably positionable with respect to the storage surface and capable of sensing the positioning information; and
a servo control system for controlling the position of the transducer relative to the storage surface, comprising,
   a signal generating stage for receiving the sensed positioning information and producing therefrom at least a first position signal wherein the first position signal includes first and second position signal components and has a measurable maximum amplitude,
   a normalizing stage for receiving and processing the first position signal according to a predetermined algorithm to produce a second position signal and wherein the second position signal is produced by stitching together the first and second position signal components,
   a controller responsive to the second position signal for producing a control signal to control the transducer position, and
   a saturation stage for determining the maximum amplitude of the first position signal, and if the maximum amplitude exceeds a predetermined nominal maximum amplitude, limiting the amplitude of the first position signal to the nominal maximum amplitude about the stitching point.

* * * * *